United States Patent
Jensen et al.

(10) Patent No.: US 7,100,299 B2
(45) Date of Patent: Sep. 5, 2006

(54) INSTALLATION TOOL FOR AEROSPACE FASTENING SYSTEM

(75) Inventors: David G. Jensen, Auburn, WA (US); David M. Pett, Seattle, WA (US); Paul Buehler, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/344,324

(22) Filed: Jan. 30, 2006

(65) Prior Publication Data

US 2006/0137203 A1 Jun. 29, 2006

Related U.S. Application Data

(62) Division of application No. 10/762,084, filed on Jan. 20, 2004.

(60) Provisional application No. 60/533,410, filed on Dec. 29, 2003.

(51) Int. Cl.
G01D 21/00 (2006.01)

(52) U.S. Cl. .................. 33/645; 33/832; 33/501.05

(58) Field of Classification Search ............... 33/645, 33/832, 833, 836, 838, 501.05, 501.08, 679.1, 33/494

See application file for complete search history.

(56) References Cited

U.S. PATENT DOCUMENTS

| | | | |
|---|---|---|---|
| 3,269,019 A * | 8/1966 | Krohn | 33/836 |
| 3,577,642 A | 5/1971 | Tripoli et al. | |
| 4,476,634 A | 10/1984 | Yamamoto et al. | |
| 5,077,909 A * | 1/1992 | Cranor | 33/607 |
| 5,189,808 A | 3/1993 | Evans et al. | |
| 5,199,175 A * | 4/1993 | Green | 33/199 R |
| 5,501,020 A * | 3/1996 | Welt | 33/555.2 |
| 5,697,166 A * | 12/1997 | Hommel | 33/758 |
| 5,875,558 A * | 3/1999 | Bakke et al. | 33/501.45 |
| 6,047,606 A * | 4/2000 | Sibole | 33/501.08 |
| 6,374,505 B1 * | 4/2002 | Myers et al. | 33/566 |
| 6,612,042 B1 * | 9/2003 | McKinney et al. | 33/501.7 |
| 6,662,456 B1 * | 12/2003 | Triplett | 33/203 |
| 6,694,832 B1 * | 2/2004 | Gleeson | 33/836 |
| 6,792,831 B1 * | 9/2004 | Crosser | 33/758 |
| 6,851,202 B1 * | 2/2005 | Schroeder et al. | 33/501.08 |

* cited by examiner

*Primary Examiner*—Yaritza Guadalupe-McCall
(74) *Attorney, Agent, or Firm*—Shimokaji & Associates, P.C.

(57) ABSTRACT

A system, for installation of fastening systems to a structure, includes a fastening system installation specification, which includes dimensional and qualitative requirements for components of the fastening systems; and a tool. The tool includes an outer housing having an interior hollow, a gage surface, and a base surface, the base surface having a contact area that contacts the surface of the structure. An inner plug disposed within the interior hollow translates axially within the interior hollow. The inner plug has a sensing end that contacts a bolt of the fastening system and references the shank section of the bolt. The inner plug has an indicator end dimensioned to accept washers and nuts of the fastening system stacked on the gage surface. The inner plug has an indicator that provides installation information, according to either qualitative or dimensional requirements, about the components of the fastening system being installed using the tool.

8 Claims, 9 Drawing Sheets

| | OUTPUT FORMATS | |
|---|---|---|
| PLUNGER DEPTH | READOUT (NUMERIC) | OPTIONAL READOUT |
| 0.000" to 0.016" | 0.032" | One 32 mil WASHER |
| 0.017" to 0.032" | 0.048" | ONE 16 mil & ONE 32 mil WASHER |
| 0.033" to 0.048" | 0.064" | TWO 32 mil WASHERS |
| etc. | etc. | etc. |

INSTALLATION TOOL FOR AEROSPACE FASTENING SYSTEM

CROSS-REFERENCE TO RELATED APPLICATIONS

The present application is a divisional application of U.S. patent application Ser. No. 10/762,084, filed Jan. 20, 2004, which claims the benefit of U.S. Provisional Patent Application No. 60/533,410, filed on Dec. 29, 2003.

STATEMENT REGARDING FEDERALLY SPONSORED RESEARCH OR DEVELOPMENT

This invention was made with Government support under contract number F33657-91-C-0006, awarded by the U.S. Air Force. The Government has certain rights in this invention.

BACKGROUND OF THE INVENTION

The present invention generally relates to mechanical fastening and, more particularly, to installation of mechanical fastening systems such as nut, washer, and bolt combinations according to strict installation specifications.

In the manufacture of commercial and military aircraft, fastening systems that fasten various components of the airframe and aircraft structure may require the fasteners to be installed according to strict installation requirements designed to ensure structural efficiency and integrity. An example of such a fastening system is the familiar combination of a bolt, nut, and one or more washers, typically used to fasten two components with a clamping action. For certain types of applications, the term "pin" may be used synonymously for "bolt". Setting the fasteners correctly is important.

To accomplish the installation of aerospace fastening systems according to the strict requirements designed to maximize structural efficiency of the hardware without compromising structural integrity, assembly of fastening systems is typically subject to three primary requirements: (1) no "threads in bearing"—meaning that only the unthreaded shank section of a bolt is allowed to contact the structure being clamped up; (2) no "shanking"—meaning that the nut cannot run so far down the threads such that the nut enters the thread transition zone of the bolt, where the bolt threads may be incomplete in the vicinity of the shank section of the bolt; and (3) sufficient "thread protrusion"—meaning that a predetermined amount of thread length must protrude completely through the nut to ensure complete nut engagement.

To comply with these, and other, requirements, aerospace fastening systems may be required to conform to installation specifications for various measurements. For example, a minimum pin protrusion dimension may be defined, and specific numerical values may be given for the dimension to exceed, according to the specific fastening system being installed, in order to guarantee compliance with requirement number (1) above.

FIGS. 1A and 1B show a typical fastening system 100 including a bolt 102 or pin 102, nut 104, and washer 106 combination. Bolt 102, nut 104, and washer 106 may be referred to generically as components of fastening system 100. Bolts 102 may be provided in various lengths—called the grip length of the bolt, which is related to the length of shank section 107 of bolt 102—depending on the thickness of structure 120 that is to be held together by the nut-bolt combination and through which the bolt 102 may pass. Length may be measured, for example, along longitudinal axis 101 of fastening system 100. Bolt 102 may include a threaded section having a thread length 108. The thread length 108 typically includes a thread transition zone 105 in the vicinity of shank section 107 where the threads of bolt 102 may be incompletely cut. The end 107a of shank section 107 is typically defined by a visible ridge at shank section end 107a between shank section 107 and thread length 108. The visible ridge may be used as an indication of the transition of shank section 107 into thread transition zone 105 or a boundary between thread transition zone 105 and shank section 107.

Different bolts may have a fixed thread length 108 for various grip lengths. In other words, a short bolt, such as bolt 102 shown in FIGS. 1A and 1B, may have threads cut for a certain length, the thread length 108, along the bolt from the end of the bolt, and the thread length 108 may be the same for a longer bolt and for a shorter bolt. Because the fasteners may have a fixed thread length 108 for various grip lengths, fasteners are required to conform to installation specifications regarding the height that the bolt is allowed to protrude, referred to as "protrusion". More specifically, a minimum pin protrusion 116 dimension may be the specified minimum height that bolt 102 may protrude above the surface 118 of structure 120, which may be, for example, an aircraft structural component. Minimum pin protrusion 116 may also be referred to in the art as "minimum pin protrusion to avoid threads in bearing." Bolt 102 not protruding far enough above the surface 118 to exceed minimum pin protrusion 116 may result in the threaded section of bolt 102 contacting the structure 120 being clamped up, exemplifying a fastening system that does not comply with the "no threads in bearing" requirement number (1) described above. A bolt 102 in which the threaded section contacts the structure 120 may result in improper fit of fastening system 100 to structure 120 as the threaded section of bolt 102 is typically smaller in diameter than the shank section 107 of bolt 102 for which structure 120 is drilled. Improper fit may lead to damage and possible failure of fastening system 100.

A maximum pin protrusion 110 dimension may be the specified maximum height that bolt 102 may protrude above the bearing surface 112 of nut 104. Maximum pin protrusion 110 may also be measured from the bearing surface 114 of washer 106, which is in contact with bearing surface 112 of nut 104. If the maximum pin protrusion 110 is exceeded, nut 104 could fully engage the last completely cut thread of the bolt 102 and enter the thread transition zone 105 before the required compression of the joint being fastened occurs. Nut 104 entering thread transition zone 105 on the bolt 102, or bindingly engaging incomplete threads of transition zone 105, which may be referred to as "bottoming out" on the threads of bolt 102, exemplifies a fastening system that does not comply with the "no shanking" requirement number (2) described above. A nut 104 that bottoms out, or engages the incompletely cut threads of transition zone 105, may result in damage to nut 104 and bolt 102, a false torque reading when tightening nut 104, or false clamp-up torque, and inadequate fastening of fastening system 100. Conforming to the maximum pin protrusion 110 specification will preclude, for example, having nut threads in the thread transition area 105 of the bolt shank and may ensure proper tightening of nut 104 and bolt 102 of fastening system 100.

A minimum thread protrusion 122 dimension may be the specified minimum height that bolt 102 may protrude above nut 104. Conforming to the minimum thread protrusion 122 specification may ensure, for example, that all threads common to the nut 104 and bolt 102 are engaged in order for fastening system 100 to function properly. For example, sufficient protrusion can allow for adequate nut retention due to full nut-to-bolt interference, which can act as an anti-back-off feature. Conversely, a thread protrusion that is less than the minimum thread protrusion 122 specification may cause fastening system 100 to fail. Bolt 102 not protruding far enough out of nut 104 to exceed minimum thread protrusion 122 exemplifies a fastening system that does not comply with the complete nut engagement requirement number (3) described above.

Two unknowns which complicate the washer selection process, i.e., determining the washer stack for a given fastening system installation, are: (1) the exact dimensions of the actual hardware involved (having non-zero tolerances) and (2) the structure thickness through which the bolt protrudes. Since the shoulder—such as the end of shank section 107 of bolt 102 at the transition to thread length 108—of the bolt must always protrude through the structure to avoid "threads in bearing", one might think that one can determine the number of washers in the stack by using the thread length dimension and nut height. Each of those dimensions, however, has a tolerance which forces one to account for both extremes of thread length and nut height. So little thread length is available on some fastening systems that variation due to manufacturing tolerances alone precludes identification of set, or universal, washer stack-ups which will work for specific hardware. Therefore, no set washer combination can be defined which will always and simultaneously meet all three installation requirements. Thus, each installation may be regarded as a unique case.

Because each fastening system installation may practically be a unique case, ensuring that each fastening system complies with all three of the requirements described above may lead to trial and error methods to complete the assembly of the fastening system at each location. For example, in the absence of exact measurements of the particular fastening system being installed, a mechanic must sometimes use a trial and error process all the way through torque-up of the fastening system to determine if the selected washer stack-up meets requirements. With too small a stack of washers, the nut will engage the shoulder of the bolt below the threads (shanking), and with too large a stack, the nut will not be fully engaged with the bolt (insufficient thread protrusion through the top of the nut). Thus, a tool is needed that can help determine how a successful fastening system installation can be made without a trial and error process and prior to torque-up of the fastening system.

Currently, installation specifications monitor a minimum pin protrusion dimension—such as minimum pin protrusion 116 shown in FIG. 1A—to be sure that enough bolt is protruding through structure—such as structure 120—so that even with tolerances, the fastening system cannot have "threads in bearing". A maximum pin protrusion dimension—such as maximum pin protrusion 110—is monitored to be sure that there is not so much thread length extending above the washers that the nut could have engaged incomplete threads near the shoulder below the threads (shanking). A minimum thread protrusion dimension—such as minimum thread protrusion 122—is monitored to be sure enough thread protrudes through the top of the nut to give confidence that the nut is fully engaged in fully formed threads and will not back off. For each type of fastening system, numerical specifications are given for each dimension, so that when the fastening system is within the numerical specification it is said to meet, or conform to, a dimensional requirement—such as minimum pin protrusion—for that type of fastening system. The values of the numerical specifications, i.e., the dimensional requirements, are set with regard to the tolerances so that when the dimensional requirements for minimum pin protrusion, maximum pin protrusion, and minimum thread protrusion are met, the fastening system will meet the qualitative requirements of having no "threads in bearing", no shanking, and complete nut engagement, respectively.

As can be seen in FIG. 1A, the dimensions (minimum pin protrusion, maximum pin protrusion, and minimum thread protrusion) overlap and so are not independent of one another. In order to guarantee that a fastening system will meet the qualitative requirements (e.g. no "threads in bearing"), the numerical specifications for the dimensional requirements (e.g. minimum pin protrusion) must cover every possible case of tolerance variation, including the worst on worst tolerance cases—for example, a tallest nut within tolerances combined with a bolt having a shortest thread length within tolerances. Thus, it can be difficult to simultaneously meet all three dimensional requirements, particularly, for example, where a fastening system has limited thread length. Thread length must be sufficient for up to one wasted washer (where an additional washer was just barely needed), the tallest nut within tolerances, and the required thread protrusion. The dimensional requirement—for thread length, for example—is restrictive in the sense that a fastening system installation can be made that meets all the qualitative requirements without meeting all the dimensional requirements. Thus, the dimensional requirements are more restrictive than the qualitative requirements because of the need for the dimensional requirements to guarantee that the qualitative requirements are met over all tolerance cases.

Prior art measurement tools typically take some sort of numerical measurement of one of the installed fastening system dimensions—such as a pin protrusion dimension—and so are adaptable almost exclusively toward working in conjunction with dimensional requirements rather than qualitative requirements. If the fastening system 100 fails to meet any of the dimensional requirements, it is deemed not to conform to the installation specification, i.e., fastening system 100 does not meet the dimensional requirements. In such a case, the fastening system installation is assumed not to meet the qualitative requirements, and the installation is rejected. It is still possible in such a case, however, due to combinations of variation of the components within tolerances, as described above, for the installation to actually meet the qualitative requirements even though the dimensional requirements are not met. Thus, the prior art gages are generally not helpful in the efficient selection, without trial and error, of proper bolt, washer, and nut combinations for each unique case that arises out of each distinct location of a fastening system installation on a structure.

As can be seen, there is a need for a tool for installation of fastening systems—such as nut and bolt fastenings used on aircraft—according to strict installation specifications that are designed to meet both dimensional and qualitative requirements. There is also a need for a tool for installation of fastening systems that facilitates efficient selection, in a predictive manner avoiding trial and error, of a proper bolt, washer, and nut combination for each unique case of fastening system installation at distinct locations on a structure. Moreover, there is a need for an installation tool that provides a combination of measurements at one time, accounting for the interactions of tolerances between different fastening system dimensions whose specifications all need to be met simultaneously. Furthermore, there is a need for a fastening system installation system including an installation tool and a new type of installation specification that allows fastening system installations to be made directly according to qualitative requirements and that is less restrictive than prior art installation specifications limited to dimensional requirements.

SUMMARY OF THE INVENTION

In one aspect of the present invention, a fastening system installation tool, for installation of a fastening system to a structure, includes an outer housing having an interior hollow, a gage surface, and a base surface. The base surface has a contact area that contacts the surface of the structure. An inner plug is disposed within the interior hollow and translates axially within the interior hollow. The inner plug has a sensing end that contacts the fastening system and an indicator end dimensioned to accept washers and nuts of the fastening system stacked on the gage surface. The inner plug has an indicator at the indicator end that provides installation information according to a fastening system installation specification about washers and nuts of the fastening system stacked on the gage surface.

In another aspect of the present invention, a fastening system installation tool, for installation of a fastening system to a structure, includes an outer housing having an interior hollow, a gage surface, and a base surface. The base surface has a contact area that contacts the surface of the structure. An inner plug is disposed within the interior hollow and translates axially within the interior hollow. The inner plug has a sensing end that contacts the fastening system and an indicator end dimensioned to accept washers and nuts of the fastening system stacked on the gage surface. The inner plug has an indicator on the indicator end that indicates whether a fastening system component selection allows conformance to a qualitative requirement of a fastening system installation specification.

In still another aspect of the present invention, a system, for installation of a fastening system to a structure, includes a fastening system installation specification, which includes dimensional requirements for components of a fastening system; and a tool. The tool includes an outer housing having an interior hollow, a gage surface, and a base surface, the base surface having a contact area that contacts the surface of the structure. An inner plug is disposed within the interior hollow and translates axially within the interior hollow. The inner plug has a sensing end that contacts a bolt of the fastening system and references the shank section of a bolt of the fastening system. The inner plug has an indicator end dimensioned to accept washers and nuts of the fastening system stacked on the gage surface, and the inner plug has an indicator on the indicator end that provides installation information according to the fastening system installation specification about the components of the fastening system being installed using the tool.

In yet another aspect of the present invention, an installation system is disclosed for installing aerospace fastening systems to a structure. The installation system includes an installation guide, in accordance with qualitative requirements for components of a fastening system, and a tool. The tool includes an outer housing having an interior hollow, a gage surface, and a base surface, the base surface having a flat contact area that contacts the surface of the structure. The tool includes an inner plug disposed within the interior hollow and translates axially within the interior hollow. The inner plug has a sensing end with an axial bore that contacts the fastening system, and the sensing end references the shank section of a bolt of the fastening system. The inner plug also has an indicator end. A transducer is connected between the outer housing and the inner plug and measures a relative displacement between the inner plug and the outer housing. Electronic instrumentation is connected to the transducer and provides and displays installation information according to the installation guide about whether the bolt, washer, and nut components of the fastening system being installed using the tool will conform to a fastening system installation specification.

In a further aspect of the present invention, a method is disclosed for installing aerospace fastening systems to a structure. The method includes the steps of: seating a base of an outer housing of a tool to a surface of the structure; referencing a shank section of a bolt of the fastening system with an inner plug of the tool; reading a threads-in-bearing indicator of the inner plug in conjunction with a gage surface of the outer housing; replacing the bolt when the threads-in-bearing indicator is not above the gage surface; and installing the bolt when the threads-in-bearing indicator is above the gage surface.

In a still further aspect of the present invention, a method for installing an aerospace fastening system to a structure includes the steps of: seating a base of an outer housing of a tool to a surface of the structure; referencing a shank section of a bolt of the fastening system with an inner plug of the tool; and reading an indicator of the tool to determine a prescribed washer stack for the fastening system.

In yet a further aspect of the present invention, a method for installing aerospace fastening systems to a structure includes the steps of: inserting a bolt of the fastening system in a hole of the structure; checking for a protrusion of a shank section of the bolt above a surface of the structure; replacing the bolt when the shank section does not protrude above the surface of the structure; seating a base of an outer housing of a tool to a surface of the structure; referencing a shank section of a bolt of the fastening system with an inner plug of the tool; stacking a first washer on a gage surface of the tool to form a stack; reading a shanking indicator of the inner plug in conjunction with the top of the stack; and adding an additional washer to the stack when the top of the stack is below the shanking indicator.

These and other features, aspects and advantages of the present invention will become better understood with reference to the following drawings, description and claims.

DETAILED DESCRIPTION OF THE INVENTION

Figure 1A:
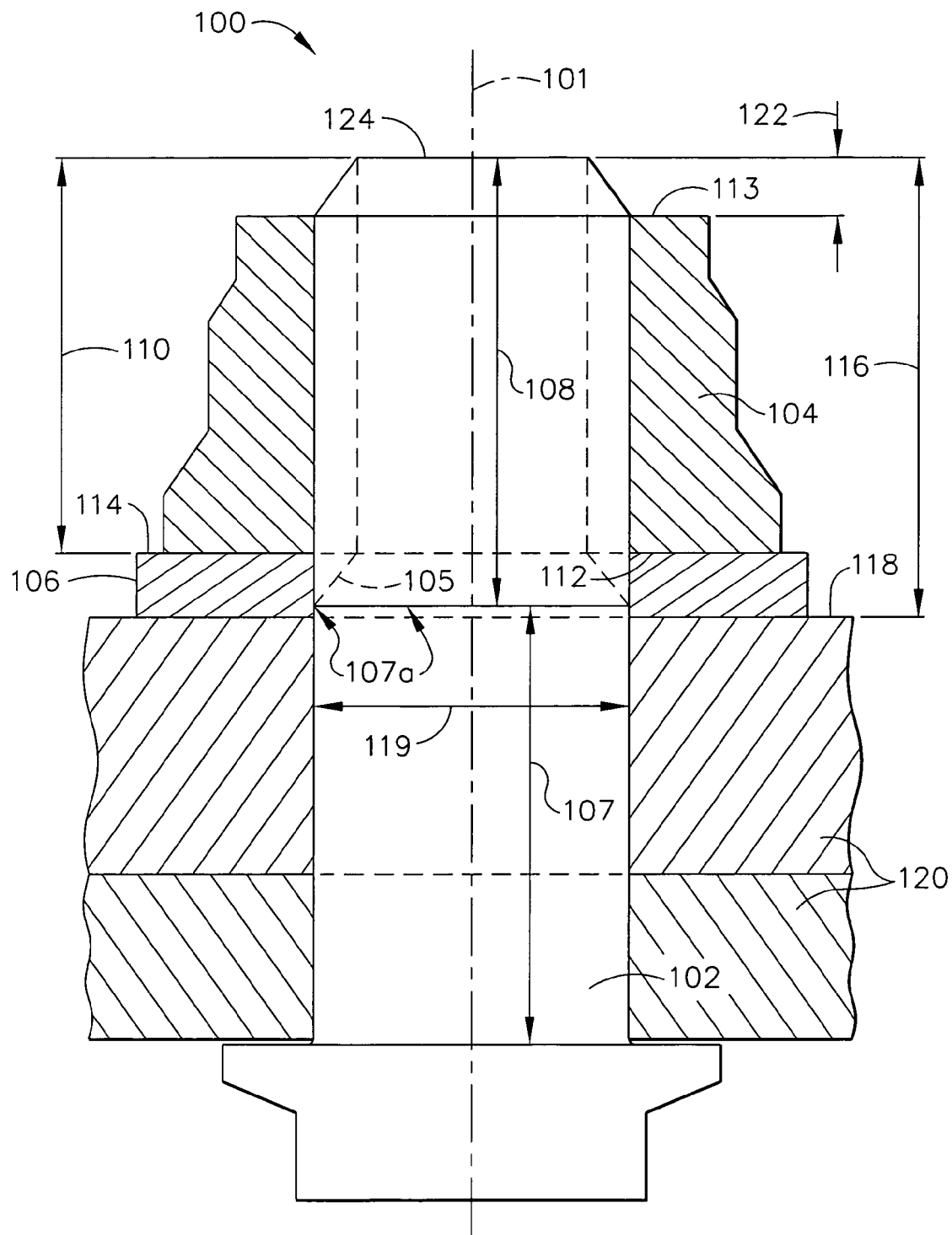
FIG. 1A is a cross-sectional diagram of a prior art nut and bolt fastening system, illustrating various measurements.
Figure 1B:
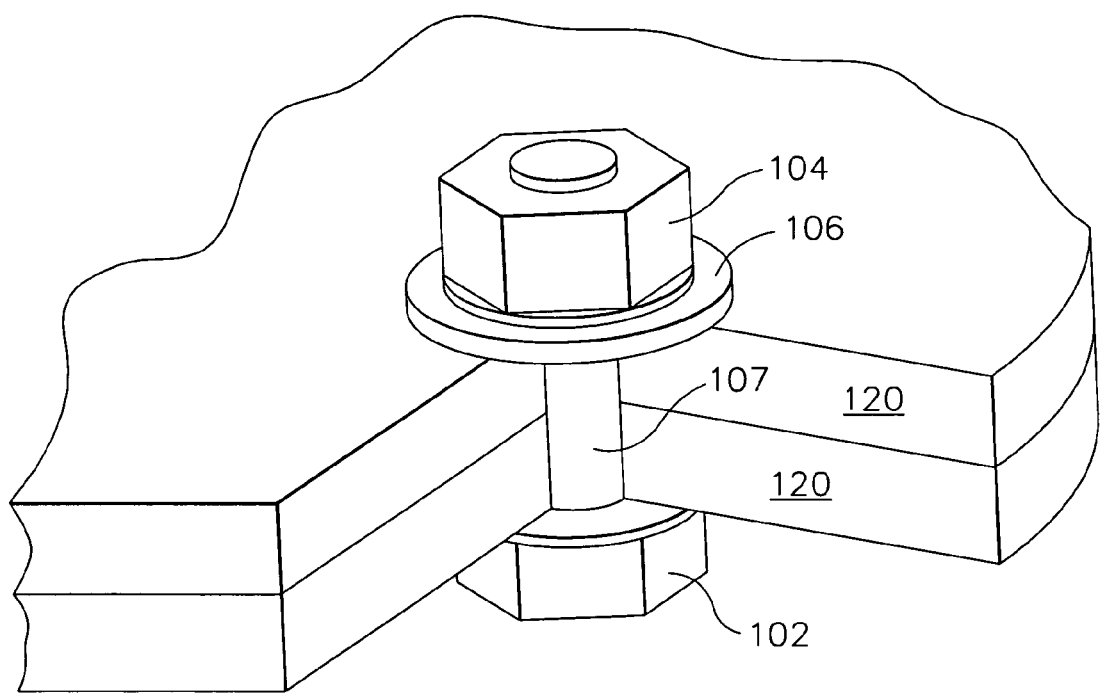
FIG. 1B is an isometric view of the prior art fastening system shown in FIG. 1A.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a tool for installation of fastening systems, such as nut and bolt fastenings used on aircraft. The tool, in one embodiment, may not only facilitate measurement for various installation specifications—such as measurement of pin protrusion—required for installation of aerospace fastening systems according to strict dimensional requirements, but may also facilitate proper selection of fastening system components to ensure adherence to qualitative requirements designed to maximize structural efficiency of the hardware without compromising structural integrity. The tool of one embodiment may be used with a fastening machine used for installing fastening systems. For example, the tool may be used to check for conformance to specifications of fastening systems being installed by machine.

A tool according to one embodiment may also facilitate efficient selection—avoiding trial and error installations, for example—of proper bolt, washer, and nut combinations for assembly of fastening systems for each unique case of fastening system installations at distinct locations on a structure so that the assembled fastening systems conform to qualitative requirements, for example, regarding (1) no "threads in bearing"; (2) no "shanking"; and (3) complete nut engagement. A basic premise of the various embodiments, illustrated herein by example, is that a tool according to an embodiment enables the mechanic to query at least one dimension of the fastening system hardware to determine how a successful installation can be made without a trial and error process. The tools according to the embodiments illustrated may measure at least one dimension on an actual bolt, sometimes looking at the thread length only (a dimension which is actually independent of the structure) and sometimes looking at the extent to which the bolt protrudes through the structure. Without this information the mechanic must sometimes make trial and error installations to determine what washer stack-up is needed. Too few washers in a stack, and the nut will engage the shoulder of the bolt below the threads (shanking). Too many washers in the stack, and there will be insufficient thread protrusion through the top of the nut. Use of a tool which queries the actual bolt to be installed removes uncertainties due to the dimensional variation of the specific bolt within tolerances and, if the tool also queries other hardware such as the washers or nut, or both, the dimensional variations associated with tolerances for those components no longer come into play either. Use of a tool on the actual bolt as trial fit in structure removes the structure thickness variable and further delineates the true washer stack requirement. The degree to which more than one hardware or structure dimension needs to be queried depends upon the hardware tolerances and installation requirements involved with the particular fastening system. Depending on the tolerances involved, the tool may be able to result in an installation which still meets all of the existing dimensional requirements. However, the dimensional requirements are more highly restrictive than the qualitative requirements because the dimensional requirements guarantee meeting requirements over all tolerance cases of the hardware. Therefore, use of a tool which eliminates some of the unknowns stemming from tolerances via gauging the hardware, may guarantee that the qualitative requirements have been met even though the installation may not result in values meeting the prior art dimensional requirements. The desire to meet the dimensional requirements versus the qualitative requirements may influence which type of tool may be used for installation of fastening systems.

In one embodiment, an installation tool may provide a combination of measurements at one time, accounting for the interactions of tolerances between different fastening system dimensions whose specifications all need to met simultaneously. One embodiment may provide a fastening system installation system including an installation tool and a new type of method of installation that allows fastening system installations to be made directly according to qualitative requirements. The new type of method of installation according to qualitative requirements may be less restrictive than prior art methods of installation according to specifications that are limited to dimensional requirements. Accordingly, fastening system specifications, according to an embodiment of the present invention, may be designed differently from prior art fastening system specifications, so that accounting for tolerances for some dimensions may be eliminated via measurement or gauging. By way of contrast, prior art specifications generally must assume that all tolerances are expressed as dependent on quantities that are themselves subject to tolerances rather than on known quantities. Thus, in one embodiment, a new type of method for fastening system installation according to the less restrictive qualitative requirements may allow, for example, for improved labor efficiency in installing fastening systems as well as relaxation of tolerances on some fastening system hardware.

Three examples can be given of general approaches for exploiting the advantages gained by the new installation tool and methods of installation. First, the new tools and methods may be used to enable successful installations with more thread length efficiency than prior art installations, thus allowing a reduction in thread length and weight savings. While weight savings are important for aircraft, a small weight savings would result if thread lengths were reduced, and so this approach may be less likely to be used. Second, the new tools and methods may be used to enable a relaxation in fastening system hardware tolerances, thus providing a cost savings. Due to broad industry use of some fastening systems, however, this approach also may be less likely to be used. Third, the new tools and methods may be used to continue using the fastening system hardware in use while increasing shop efficiency by reducing trial and error installations and rejections. This approach appears to be the most likely to provide a readily gained advantage.

Also in contrast to the prior art, the tool according to one embodiment may provide measurement indications in a graphical or physical format during installation of fastening systems so that the tool facilitates efficient selection of proper bolt, washer, and nut combinations for the unique case of each location of a fastening system installation on a structure—such as an aircraft part or aerospace product. A graphical format indication may be given, for example, by a display providing results such as those shown in FIG. 6B. A physical format indication may be given, for example, by stacking washers on a tool with shoulders so that if the washers fit evenly against or above a particular shoulder, it is known that a proper installation of the fastening system will result.

Further in contrast to the prior art, the tool of one embodiment may incorporate a plunger or an inner plug, or both, that have a novel structure that is specifically formed in accordance with fastening system requirements, in order to provide direct assistance in the selection of proper bolt, washer, and nut combinations. A part of the novel structure, for example, may include the formation of shoulders at specific heights and locations on the inner plug (or plunger or both) or the formation of color bands at specific heights and locations on the inner plug (or plunger or both), corresponding to fastening system installation specifications in such a way that, for example, the actual washers to be used can be stacked on the tool to determine whether those particular washers will conform to installation specification requirements when assembled with the fastening system being measured by the tool. Another part of the novel structure, for example, may include a plunger with a sliding fit within an interior hollow of an inner plug to measure, for example, a particular pin protrusion according to a specification. Different inner plugs (or plungers or both) may be provided for different size fastening systems so that, for example, the inner plug may be threaded or otherwise fitted to give a precise shanking measurement for a particular size fastening system.

In one embodiment, a fastening system installation and measurement tool may be interfaced to an electronic system through the use of a transducer connected to the tool. Software may be created and used to provide specifically needed user information or a simple digital measurement readout.

Figure 2A:
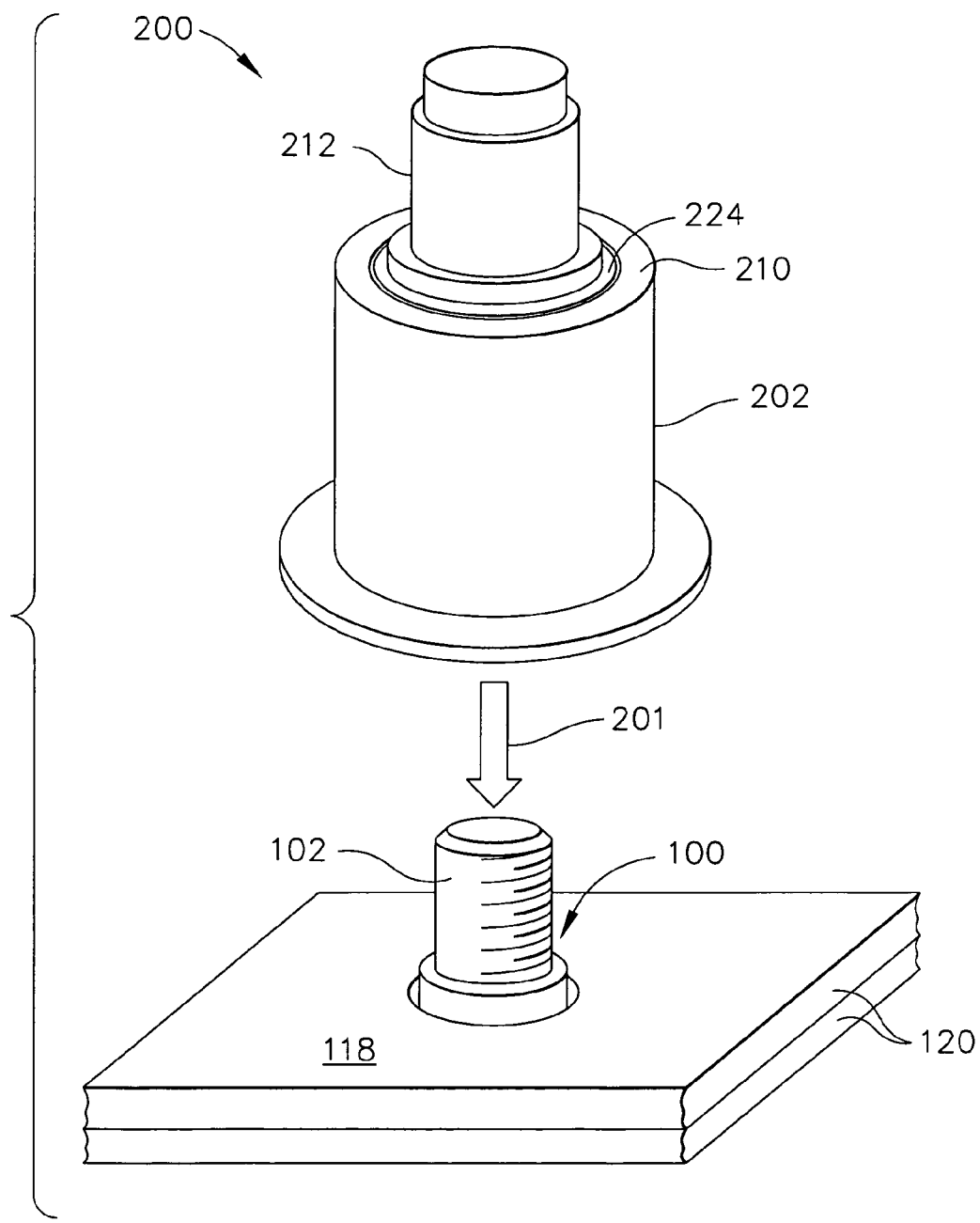
FIGS. 2A and 2B are perspective illustrations of a fastening system installation tool, according to one embodiment of the present invention, showing placement of the tool relative to a structure and fastening system.
Figure 2B:
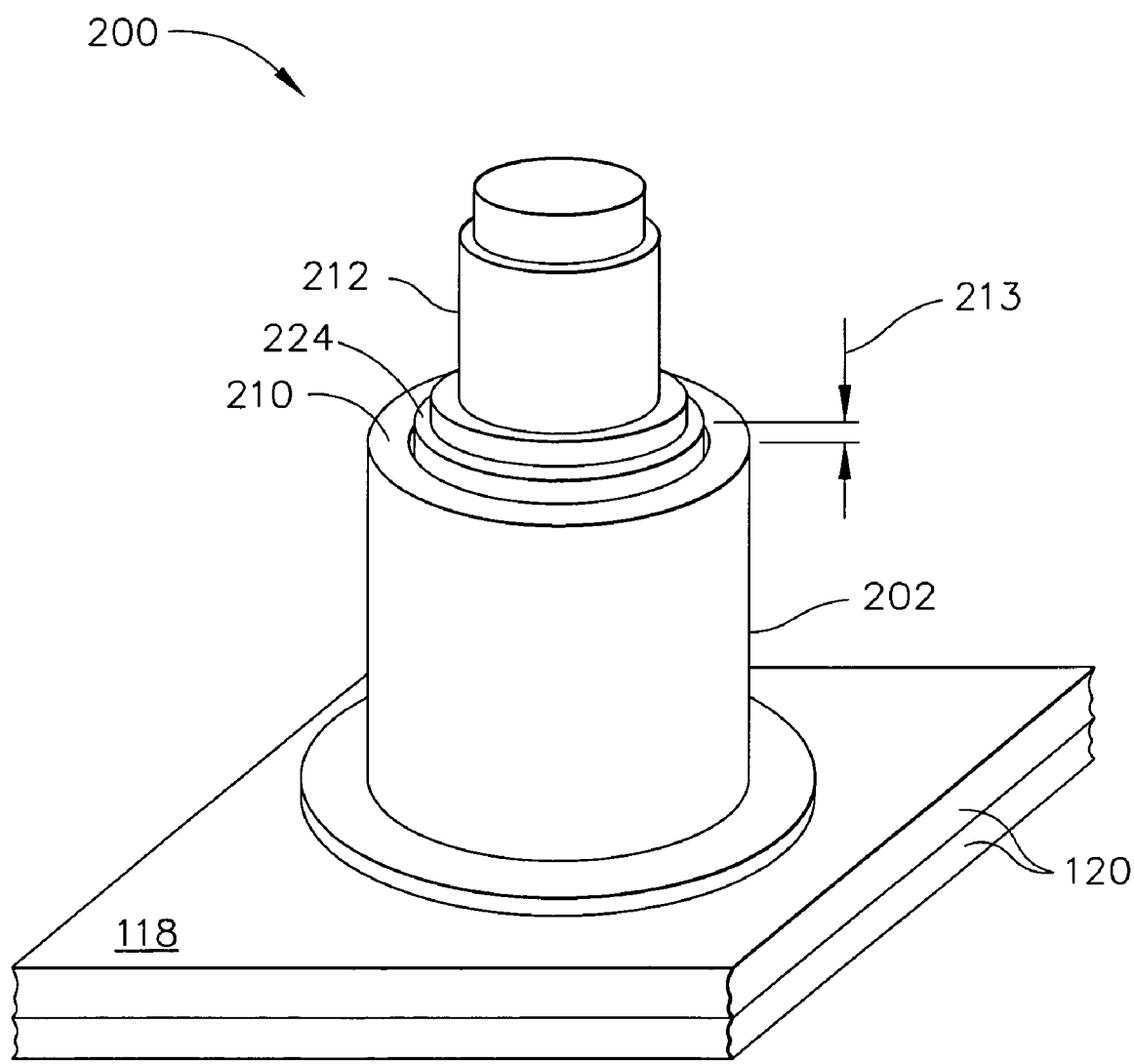
Figure 2C:
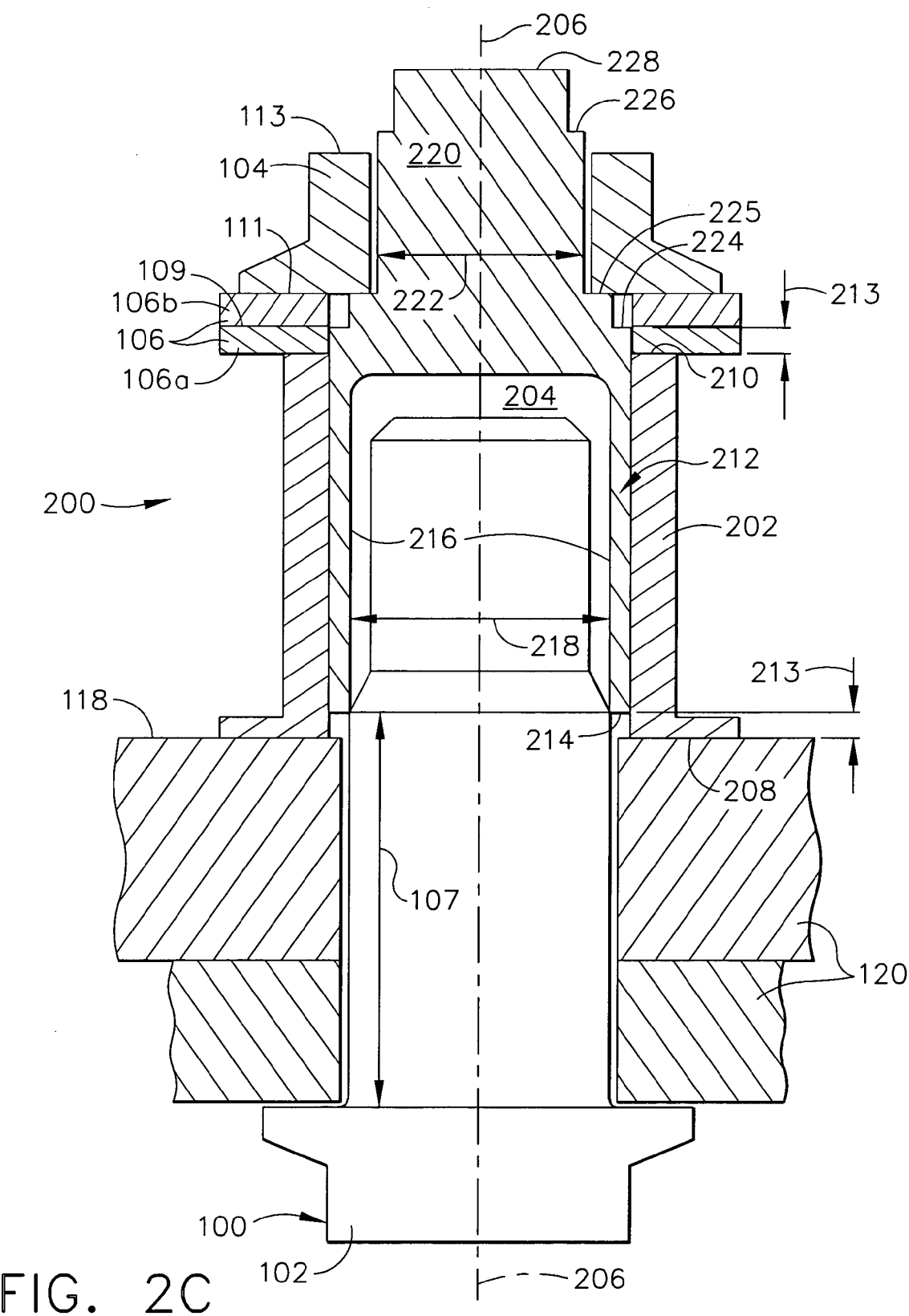
FIG. 2C is a side, cross-sectional, diagrammatical view of a fastening system installation tool, according to one embodiment of the present invention, showing placement of the tool relative to a structure and fastening system.

Referring now to the figures, in which like items are referenced with the same numeral throughout, and referring, in particular, to FIGS. 2A, 2B, and 2C, an aerospace fastening system installation tool 200 is illustrated in accordance with one embodiment. Tool 200 may include an outer housing 202, which may also be referred to as an outer sleeve 202. Outer housing 202 may have an interior hollow 204 which may be an axial bore that extends parallel to the direction of a longitudinal axis 206 of tool 200. Outer housing 202 may include a base surface 208, which may contact surface 118 of structure 120 and which may firmly seat tool 200 on surface 118. Base surface 208 may be flat. Base surface 208, for example, may have an annular shape that may surround an opening larger than a diameter of a bolt 102 of the fastening system 100 so that the contact area of base surface 208 with surface 118, or "footprint" of outer housing 202, may allow passage of the threaded section and shank section of a bolt 102 of a fastening system 100 into interior hollow 204 of outer housing 202. The contact area of base surface 208, or "footprint" of outer housing 202, also, for example, may resemble the footprint of a washer 106 of fastening system 100. Outer housing 202 may include a gage surface 210. Gage surface 210 may be flat within an accuracy sufficient to provide consistent or precise readings of tool 200 in accordance with a fastening system installation specification, as further described below. Gage surface 210 may be perpendicular to longitudinal axis 206. Gage surface 210 may also be formed at an oblique, or non-perpendicular angle to longitudinal axis 206 so that, for example, gage surface 210 could be a conical surface if desired. Outer housing 202 may be made, for example, of nylon.

Tool 200 may include an inner plug 212, which may also be referred to as an inner sleeve 212. Inner plug 212 may be disposed within interior hollow 204 of outer housing 202 so that inner plug 212 may translate axially, i.e., in a direction parallel to longitudinal axis 206, within interior hollow 204, guided by interior hollow 204. An example of the relative motion, which may be a telescoping or sliding motion, of outer housing 202 and inner plug 212 during operation of tool 200 is illustrated by FIGS. 2A and 2B. A more detailed description of the operation of tool 200 is provided further below. Thus, when outer housing 202 of tool 200 is placed over a fastening system 100, as indicated by arrow 201, shown in FIG. 2A, inner plug 212 may be displaced axially with respect to outer housing 202 by bolt 102 of fastening system 100, resulting in axial displacement 213, shown in FIG. 2B, of threads-in-bearing shoulder 224 relative to gage surface 210, which are shown, for example, in FIG. 2A as being initially flush with each other. Inner plug 212 may be made, for example, of hard tool steel, and may have a free sliding fit inside of outer housing 202 or may have an interference fit or frictional fit inside of housing 202, depending on a particular application for which the tool 200 may be intended. For example, in applications where tool 200 may be used while remaining in place over a fastening system 100, a free sliding fit may be preferable. Also, for example, in applications where tool 200 may need to be removed from over a fastening system 100 during use, a frictional fit that temporarily preserves the axial displacement 213 of inner plug 212 relative to outer housing 202 may be preferable.

Inner plug 212 may have a sensing end 214 that may contact bolt 102. Inner plug 212 may have an axial bore 216, i.e., a bore which extends parallel to the direction of longitudinal axis 206. Axial bore 216 may extend through the sensing end 214 of inner plug 212 so that bolt 102 may enter interior hollow 204.

As seen in FIG. 2C, axial bore 216 may have a diameter 218 that is greater than the thread diameter of a bolt 102 of the fastening system 100 but less than the shank diameter 119 (shown in FIG. 1A) of shank section 107 of bolt 102 of the fastening system 100. For example, diameter 218 may be approximately 0.001 inch greater than the thread diameter of bolt 102. Thus, when tool 200 is placed over fastening system 100, sensing end 214 may slide freely over the thread length 108 of bolt 102 until sensing end 214 reaches the shank section 107 of bolt 102 and stops, in which situation inner plug 212, or sensing end 214 of inner plug 212, is said to "reference" the shank section 107 of bolt 102.

Alternatively, for example, axial bore 216 may be threaded to match the threads of bolt 102 so that inner plug 212 may be screwed onto bolt 102 until sensing end 214 reaches the shank section 107 of bolt 102 and stops, thus referencing the shank section 107 of bolt 102. Threading of axial bore 216 may add confidence during operation of tool 200 that mating of fastening system 100 to structure 120 is reasonably "firm" but may necessitate, for example, either splining of inner and outer sleeves 212 and 202 to transmit torque from outer sleeve 212 to inner sleeve 202 or sequential placement of inner and outer sleeves 212 and 202 during operation of tool 200. Also, threading of axial bore 216 may necessitate either that the measurement made by the tool 200 be read with tool 200 left in place or that tool 200 resist losing the measurement while being spun off the bolt, for example, by use of a mechanically "stiff" frictional fit between inner plug 212 and outer housing 202 of tool 200 or electronic retention of the measurement using a transducer and electronic instrumentation as described below with reference to FIG. 6A.

Figure 4A:
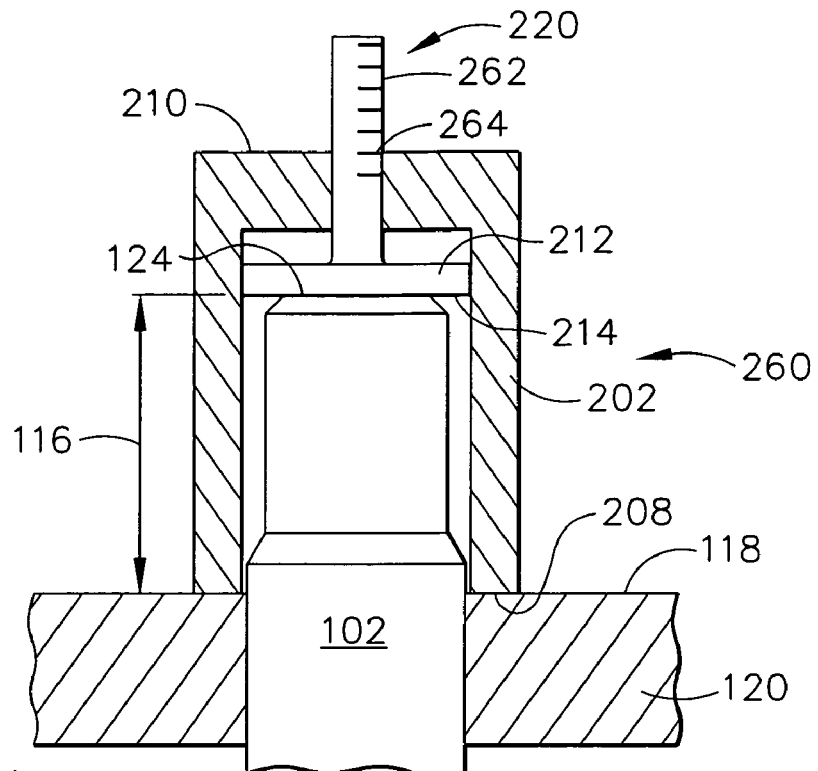
FIGS. 4A and 4B are side, cross-sectional diagrams of a fastening system installation tool, showing how the same tool can be used to perform two different measurements, according to still another embodiment of the present invention.

Inner plug 212 may also be configured as shown in FIG. 4A, for example, without an axial bore 216, so that sensing end 214 stops upon contact of inner plug 212 with an end 124 of bolt 102 of a fastening system 100, in which situation inner plug 212, or sensing end 214 of inner plug 212, is said to "reference" the end 124 of bolt 102.

Continuing with FIGS. 2A, 2B, and 2C, inner plug 212 may have an indicator end 220. Indicator end 220 may be dimensioned to accept washers 106 and nuts 104 of the fastening system 100 stacked on gage surface 210, as shown in FIG. 2C. For example, indicator end 220 may have a diameter 222 that is approximately 0.020 inch less than the thread diameter of bolt 102 for allowing a nut 104 to be easily stacked on inner plug 212. FIGS. 2A, 2B, and 2C show an example of a tool that gives measurement indications in a physical format, as described above, using shoulders as indicators that are readable in conjunction with gage surface 210, for example, by noting whether the shoulder is below, even with, or above gage surface 210. Similarly, the shoulder indicators may be readable in conjunction with fastening system components—such as washers and nuts—stacked on gage surface 210, for example, by noting whether the shoulder is below, even with, or above a top surface of the component. The shoulders may be used as indicators to provide installation information about components of the fastening system being installed using the tool—such as washers 106 and nut 104 of the fastening system stacked on gage surface 210 as shown in FIG. 2C. The indicators may provide installation information—such as whether the installation conforms to qualitative and dimensional requirements—according to a strict fastening system installation specification.

For example, inner plug 212 may have an indicator at indicator end 220 in the form of threads-in-bearing shoulder 224. If threads-in-bearing shoulder 224 is translated up from its initial flush condition with respect to gage surface 210, i.e., if axial displacement 213 is a positive finite amount, it may be known that fastening system 100 shown in FIG. 2C conforms to the qualitative requirement of "no threads in bearing". Shanking shoulder 225 may indicate whether fastening system 100 will conform to the qualitative requirement of "no shanking" upon installation of washers 106. For example, upon installation of washer 106a, fastening system 100 will not conform to "no shanking" because the top surface 109 of washer 106a is below shanking shoulder 225, as shown in FIG. 2C. Upon installation of washer 106b, however, fastening system 100 will conform to "no shanking" because the top surface 111 of washer 106b may be either above or even with shanking shoulder 225, as shown in FIG. 2C.

Inner plug 212 may have another indicator in the form of short-thread bolt protrusion shoulder 226. Inner plug 212 also may have another indicator in the form of long-thread bolt protrusion shoulder 228. The two thread bolt protrusion shoulders 226 and 228 may be provided to cover two different cases of long-thread and short-thread bolts 102, which may be manufactured with purposefully designed short or long thread length 108 sections. (The "long" and "short" in this instance refer to the type of bolt being used, and not to tolerances of thread length sections.)

For example, for a bolt 102 having a short thread length 108, i.e., a short-thread bolt, short-thread bolt protrusion shoulder 226 may indicate whether fastening system 100 will conform to the qualitative requirement of complete nut engagement upon installation of nut 104. For example, upon installation of appropriate washer stack 106 and nut 104, fastening system 100 will conform to "complete nut engagement" because the top surface 113 of nut 104 is below short-thread bolt protrusion shoulder 226, as shown in FIG. 2C. On the other hand, if top surface 113 of nut 104 is above short-thread bolt protrusion shoulder 226, then there is insufficient thread protrusion for complete nut engagement for the particular nut 104, washer stack 106, and short-thread bolt 102 being installed, and one or the other (nut 104 or bolt 102) should be replaced or, alternatively, a long-thread bolt 102 may be selected for installation. For a bolt 102 having a long thread length 108, i.e., a long-thread bolt, long-thread bolt protrusion shoulder 228 may indicate in a similar fashion to that just described whether fastening system 100 will conform to the qualitative requirement of complete nut engagement upon installation of nut 104 to a long-thread bolt 102. Thread protrusion shoulders 226 and 228 also may be similarly used to verify the dimensional requirement of minimum thread protrusion in addition to the qualitative requirement of complete nut engagement.

The precise locations of and distances between the indicators—such as shoulders 224, 225, 226, and 228—may be chosen according to a fastening system installation specification for the particular fastening systems that the tool is to used with. For example, the distance between threads-in-bearing shoulder 224 and short-thread bolt protrusion shoulder 226 may correlate to the specifications given for bolt 102, taking into account the worst case tolerance combinations, as described above. Also, for example, the positions and distances between threads-in-bearing shoulder 224, shanking shoulder 225, and short-thread bolt protrusion shoulder 226 may correlate to the dimensional specifications, such as maximum pin protrusion 110, minimum pin protrusion 116, and minimum thread protrusion 122. It should be noted that the heights of surfaces 226 and 228 relative to surfaces 224 must be configured to account for the required thread protrusion. Since tool 200 does not query the bolt end, e.g. inner plug 212 does not reference bolt end 124 in FIG. 2C, tool 200 should take thread length tolerance into account, and the heights of surfaces 226 and 228 relative to surface 224 should correspond to the "minimum thread length within bolt tolerance" less the required thread protrusion. Thus, tool 200 may be used not only to provide installation according to qualitative requirements, as described above, but may also be used to provide installation according to dimensional requirements in the more conventional manner. Use of tool 200 to provide direct information according to qualitative requirements, however, has several advantages over the prior art, as described above.

Using a tool—such as tool 200, a method of installing aerospace fastening systems—such as a bolt 102, washer 106, and nut 104 combination—may include the following steps. Insert bolt 102 fully in structure 120 hole. If the tool—such as tool 200—does not have a threads-in-bearing indicator—such as threads-in-bearing shoulder 224—then check for the existence of shank 107 protruding above structure surface 118. If shank 107 is not above structure surface 118, replace bolt 102 due to "threads in bearing". In other words, bolt 102 does not meet the qualitative requirement of no "threads in bearing" and so a bolt 102 with a longer shank section 107 should be installed. The above steps are repeated until shank 107 protrudes above structure surface 118. With shank 107 above structure surface 118, place the tool 200 with an outer housing 202 having a base surface 208 on a structure surface—such as surface 118 of structure 120—seating base surface 208 of outer housing 202 where the washers 106 will eventually sit. As the outer housing 202 is seated over bolt 102, the inner plug 212 will telescope up as commanded by contact with the bolt 102. To fully seat the inner plug 212, thread or slide inner plug 212 onto bolt 102 until inner plug 212 shanks bolt 102 or cannot go on more, i.e., until sensing end 214 of inner plug 212 references the shank section 107 of bolt 102. Add actual washers 106 stacked on gage surface 210 and continue with the method at this point, as described below.

If the tool—such as tool 200—does have a threads-in-bearing indicator—such as threads-in-bearing shoulder 224—then place the tool 200 with an outer housing 202 having a base surface 208 on a structure surface—such as surface 118 of structure 120—seating base surface 208 of outer housing 202 where the washers 106 will eventually sit. As the outer housing 202 is seated over bolt 102, the inner plug 212 will telescope up as commanded by contact with the bolt 102. To fully seat the inner plug 212, thread or slide inner plug 212 onto bolt 102 until inner plug 212 shanks bolt 102 or cannot go on more, i.e., until sensing end 214 of inner plug 212 references the shank section 107 of bolt 102. Read a threads-in-bearing indicator—such as threads-in-bearing shoulder 224 of inner plug 212—in conjunction with gage surface 210 of outer housing 202. If threads-in-bearing shoulder 224 is not above outer housing gage surface 210, the mechanic may remove the tool 200 and visually double check the bolt 102 to make sure that the end 107a of the shank section 107 is either flush with or above surface 118 so that there are no threads in bearing, or may replace bolt 102 due to "threads in bearing". In other words, bolt 102 does not meet the qualitative requirement of no "threads in bearing" and so a bolt 102 with a longer shank section 107 should be installed. The above steps are repeated until threads-in-bearing shoulder 224 is above outer housing gage surface 210. With threads-in-bearing shoulder 224 above outer housing gage surface 210, add actual washers 106 stacked on gage surface 210, as in the case of a tool with no threads-in-bearing indicator described above, and continue the method by reading the shanking indicator—such as shanking shoulder 225 of inner plug 212—in conjunction with the top of the stack until washers 106 stack even with or above, i.e. not below, shanking shoulder 225 to validate the qualitative requirement of no "shanking".

Add actual nut 104 to the stack on gage surface 210 and verify bolt protrusion meeting the dimensional requirement of minimum thread protrusion or the qualitative requirement of complete nut engagement by reading a thread bolt protrusion indicator—such as short-thread bolt protrusion shoulder 226 or long-thread bolt protrusion shoulder 228—of inner plug 212 in conjunction with nut 104. Both long and short bolt thread length indicators may be included in the gage indicators of inner plug 212. For example, in order to meet the complete nut engagement qualitative requirement, the top surface 113 of nut 104 should be below short-thread bolt protrusion shoulder 226 for a short-thread bolt 102, and the top surface 113 of nut 104 should be below long-thread bolt protrusion shoulder 228 for a long-thread bolt 102. If the top surface 113 of a nut 104 is above the appropriate indicator, the nut or bolt should be replaced due to not meeting the complete nut engagement qualitative requirement and a nut or bolt meeting the complete nut engagement qualitative requirement may be installed. A minimum thread protrusion dimensional requirement may be similarly verified.

Figure 3:
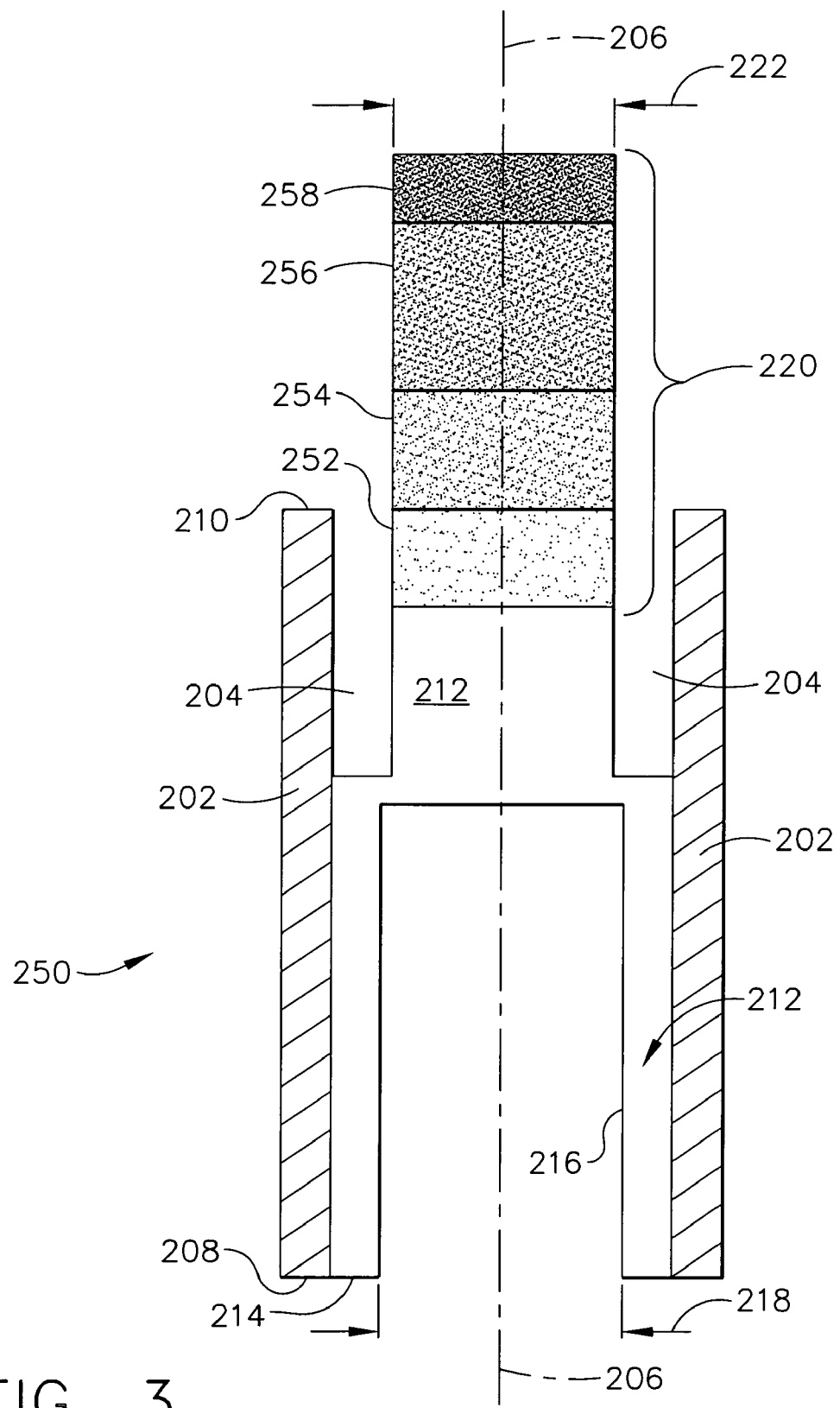
FIG. 3 is a side, cross-sectional diagram of a fastening system installation tool, according to another embodiment of the present invention.

Referring now to FIG. 3, a fastening system installation tool 250 is illustrated in accordance with another embodiment. Fastening system installation tool 250 may be similar in form and function to fastening system installation tool 200 and may include an outer housing or sleeve 202, which may be made, for example, from nylon, with base surface 208, an interior hollow 204 oriented along longitudinal axis 206, and a gage surface 210, as described above. Tool 250 may also include an inner plug or sleeve 212, which may be made, for example, from hard tool steel, with a sensing end 214, an axial bore 216 having diameter 218, and an indicator end 220 with maximum diameter 222, as described above. Inner sleeve 212 may be made to have an interference fit with outer sleeve 202, also as described above. Indicator end 220 may include indicators such as threads-in-bearing color band 252, shanking color band 254, short-thread bolt minimum thread protrusion color band 256, and long-thread bolt minimum thread protrusion color band 258. Color bands 252, 254, 256, and 258 may have positions and distances between color bands (e.g. color band thicknesses) to correlate to a dimensional requirement of the fastening system installation specification, as described above in the case of shoulders 224, 225, 226, and 228, respectively. For example, the edge of a color band (or boundary between two color bands) of tool 250 may have the same position, or distance from sensing end 214, as a shoulder of tool 200. Color bands 252, 254, 256, and 258 may be used, for example, in a manner similar to that of shoulders 224, 225, 226, and 228 as described above for the installation of fastening systems such as fastening system 100, including the stacking of fastening system components over indicator end 220 on gage surface 210. In addition, any color band—such as shanking color band 254—may be subdivided further, for example, using index markings or additional color bands, to increase the flexibility or specialized use of the installation tool—such as tool 250. For example, supplying additional color bands or index markings in the region of shanking color band 254 may enable selection of appropriate washers in accordance with available washer thicknesses, using, for example, the method described below in connection with exemplary installation guide 290 shown in FIG. 6B.

More specifically, methods of using tool 250 for the installation of fastening systems—such as fastening system 100—according to strict dimensional and qualitative requirements may include a mechanic inserting a bolt—such as bolt 102—through a joint in a structure—such as structure 120—that is to be fastened and placing installation tool 250 over the thread end of the bolt 102. The tool 250 may be used to measure the location of the bolt shoulder relative to the surface 118 of structure 120, i.e., sensing end 214 reaches the shank section 107 of bolt 102 and stops, thus referencing the shank section 107 of bolt 102. Due to an interference fit between outer sleeve 202 and inner sleeve 212, inner sleeve 212 may maintain its position relative to outer sleeve 202 after the mechanic has removed tool 250 from the threads of bolt 102.

Next, threads-in-bearing color band 252 may be read in conjunction with gage surface 210 to determine compliance with a no threads-in-bearing qualitative requirement. The mechanic may check to see if the threads-in-bearing color band 252 is visible above gage surface 210. If threads-in-bearing color band 252 is visible above gage surface 210, the installation may meet the no threads in bearing qualitative requirement; otherwise bolt 102 should be replaced, as described above.

Shanking color band 254 may then be read in conjunction with washers—such as washer 106—stacked on gage surface 210 (as shown in FIG. 2C). The mechanic may use the minimum number of washers required to completely cover the shanking color band 254 to ensure that the installation meets the no shanking qualitative requirement, or alternatively a maximum pin protrusion 110 dimensional requirement. Stacking the actual washers to be used in the particular installation being performed and measured may account for washer thickness tolerances, i.e. removes uncertainties due to the dimensional variation of the specific washers within tolerances.

Short-thread bolt minimum thread protrusion color band 256 may be read in conjunction with a nut—such as nut 104—stacked on washers 106 on gage surface 210 (as shown in FIG. 2C) to ensure that a dimensional requirement of minimum thread protrusion, or a qualitative requirement of complete nut engagement is met when a short-thread bolt 102 is installed. The mechanic may place the nut 104 to be used in the installation assembly on top of the stack of washers 106. If any of short-thread bolt minimum thread protrusion color band 256 shows above the top of the nut 104, the installation will meet the minimum thread protrusion or complete nut engagement requirement. Measuring the actual nut and washers to be used in the particular installation being assembled may account for both the tolerances applied to the total nut height and the washer thickness.

Similarly, long-thread bolt minimum thread protrusion color band 258 may be used as described above when a long-thread bolt 102 is installed.

Figure 4B:
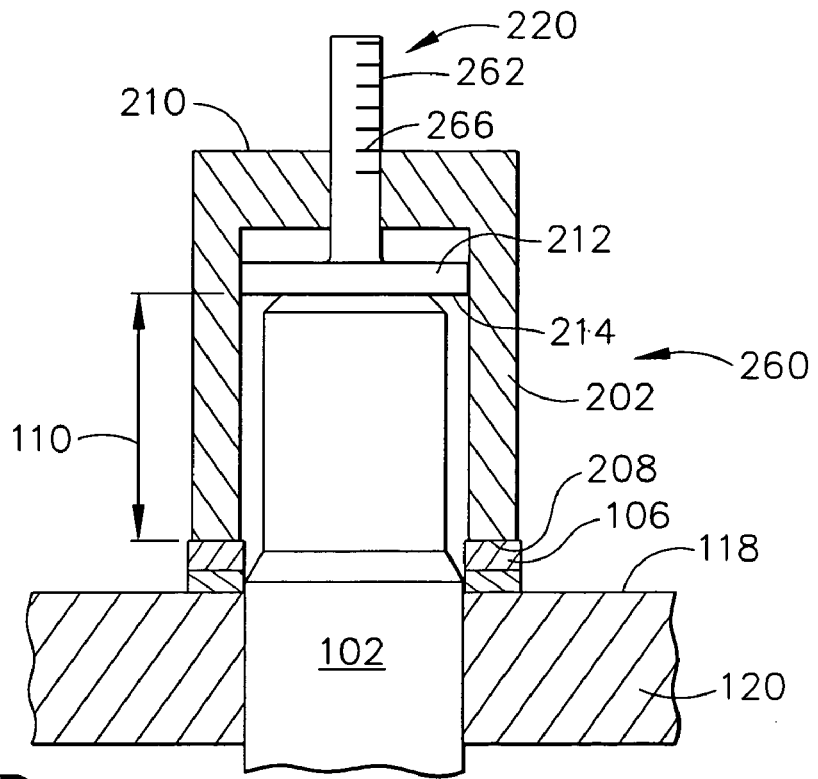

Referring now to FIGS. 4A and 4B, a fastening system installation tool 260 is illustrated in accordance with another embodiment. Fastening system installation tool 260 may be similar in form and function to fastening system installation tools 200 and 250 and may include an outer housing or sleeve 202, with a gage surface 210 and a base surface 208, which may be seated on a structure—such as surface 118 of structure 120 as shown in FIG. 4A—or on a stack of washers 106 as shown in FIG. 4B.

Tool 260 may also include an inner plug 212, with a sensing end 214, which may reference an end of a bolt—such as end 124 of bolt 102. Inner sleeve 212 may be made to have an interference fit or a sliding fit with outer sleeve 202, as described above. Inner plug 212 may have an indicator end 220. Indicator end 220 may include indicators such as index markings 262. Index markings 262 may have positions and distances between index marks that correlate to dimensional requirements of the fastening system installation specification, as described above in the case of shoulders 224, 225, 226, and 228. Index markings 262 also, for example, may be numerically labeled and conform to a standard of measurement such as inches or millimeters.

When used as shown in FIG. 4A, installation tool 260 may provide a minimum pin protrusion measurement 264, corresponding to a minimum pin protrusion 116 dimension of a fastening system installation specification and, thus, may be used to verify a minimum pin protrusion dimensional requirement. When used as shown in FIG. 4B, with base surface 208 placed on top of a stack of washers 106, installation tool 260 may provide a maximum pin protrusion measurement 266, corresponding to a maximum pin protrusion 110 dimension of a fastening system installation specification and, thus, may be used to verify a maximum pin protrusion dimensional requirement. A minimum thread protrusion 122 (see FIG. 1A) dimensional requirement, ($U_{min}$), may also be verified by subtracting the actual nut thickness from measurement 266 ($P_{actual}$), so that $U_{min}$ will be satisfied if:

$$U_{min} \leq P_{actual} - \text{(actual nut thickness)} \qquad (1).$$

By placing the nut 104 on the tool 260 over indicator end 220 of inner plug 212 and resting on gage surface 210, one could actually have the tool 260 "perform" this subtraction for the operator by simply reading the protrusion from the index marking 262 visible at the top surface 113 of nut 104 and checking that the protrusion is greater than or equal to $U_{min}$.

Figures 6A, 6B:
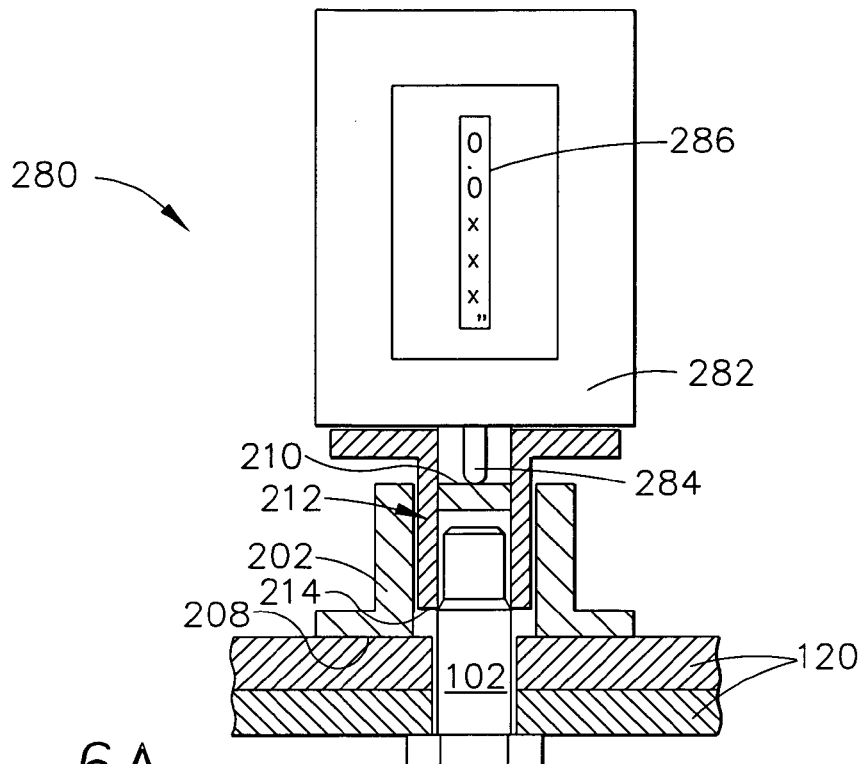
FIG. 6A is a side, cross-sectional diagram of a fastening system installation tool incorporating an automated readout, according to yet another embodiment of the present invention.
FIG. 6B is a table showing an exemplary installation guide, in accordance with an embodiment of the present invention, and illustrates an exemplary correspondence of readouts of a fastening system installation tool with exemplary washer stack prescriptions.

As may be understood by one of ordinary skill in the art, any of fastening system installation tools 200, 250, 260, and 270 may have a transducer and instrumentation attached and functionally connected to the tool so as to display information given by the indicators—such as shoulders 224–228, color bands 252–258, and index markings 262. It may be a routine matter, for example, to program or configure instrumentation to make calculations such as equation (1) and display the results in any useful format. An example configuration of a transducer and display instrumentation attached to a fastening system installation tool 280 is illustrated in FIG. 6A.

Figure 5:
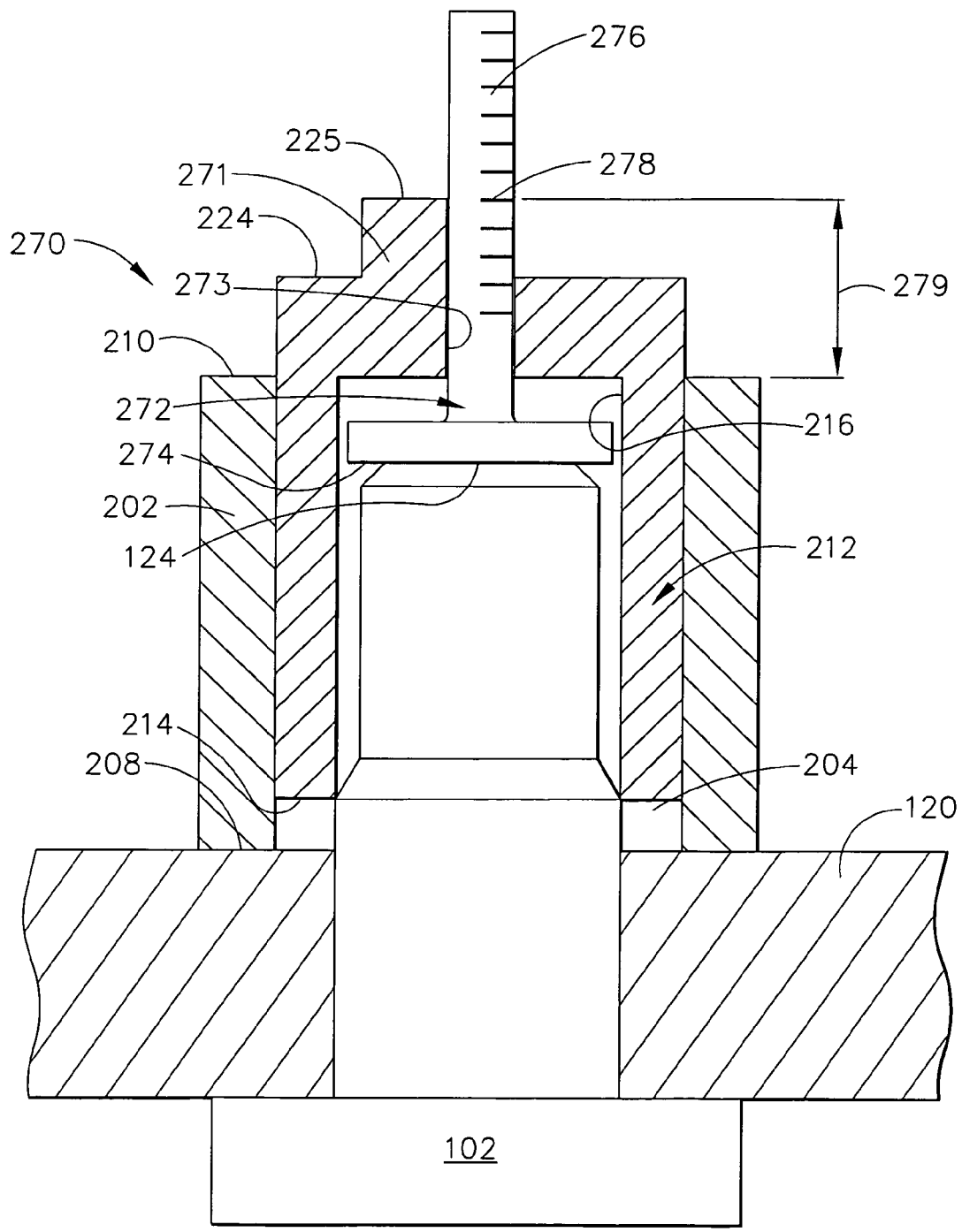
FIG. 5 is a side, cross-sectional diagram of a fastening system installation tool, according to yet another embodiment of the present invention.

Referring now to FIG. 5, a fastening system installation tool 270 is illustrated in accordance with another embodiment. Fastening system installation tool 270 may be similar in form and function to fastening system installation tools 200, 250, and 260 and may include an outer housing or sleeve 202, with a gage surface 210 and a base surface 208, which may be seated on a structure—such as structure 120 as shown in FIG. 5.

Tool 270 may also include an inner plug 212, with a sensing end 214, and an axial bore 216 so that sensing end 214 may reference the shank section of a bolt—such as shank section 107 of bolt 102—as described above and as shown in FIG. 5. Inner plug 212 may include a dome 271 having an axial opening 273 that guides axial translation of a plunger 272. Inner plug 212 may include indicators such as threads-in-bearing shoulder 224 and shanking shoulder 225, which may be read, as described above, in conjunction with gage surface 210 or in conjunction with washers—such as a washer 106—stacked on gage surface 210 to verify, for example, both no threads-in-bearing and no shanking qualitative requirements. As shown in FIG. 5, shoulder 225 may be provided on only a portion of the circumference of dome 271 so as not to preclude viewing of, in conjunction with shoulder 224, plunger index markings 276 on plunger 272. It may be easily understood that additional shoulders—such as shoulders 226 and 228 of tool 200—may be added to tool 270 on only portions of the circumference of dome 271 so as not to preclude viewing of plunger index markings 276 in conjunction with shoulder 224. It may also be easily understood that tool 270 may be configured without any additional shoulders—such as shoulder 225—and may be provided only with a single shoulder such as shoulder 224.

Plunger 272 may have a sensing end 274 which may be designed to reference an end of a bolt—such as end 124 of bolt 102. Plunger 272 may be made to have an interference fit or a sliding fit within axial opening 273 of inner plug 212. Axial bore 216 of inner plug 212 may also be adapted for a sliding or interference fit with a wide portion of plunger 272 located near sensing end 274 of plunger 272 for guiding axial translation of plunger 272 relative to inner plug 212.

Plunger 272 may include an indicator such as plunger index markings 276 which may be read in conjunction with shanking shoulder 225 to provide a measurement 278, which may be, for example, a maximum pin protrusion measurement. Thus, plunger 272 may also, as described above, provide installation information, according to dimensional and qualitative requirements of a fastening system installation specification, about components of the fastening system being installed using tool 270.

A minimum thread protrusion 122 (see FIG. 1A) dimensional requirement, ($U_{min}$), may also be verified using tool 270 according to the following equations. Equation (2), which is similar to equation (1) above, uses $P_{actual}$ to represent the actual pin protrusion that would be measured for an actual washer stack to be installed with the fastening system.

$$U = P_{actual} - (\text{actual nut thickness}) \qquad (2)$$

Thus, U represents the actual thread protrusion, for example, for a given bolt 102 installed to a particular location in a structure 120 using a given stack of washers 106 and a given nut 104. Therefore, to meet $U_{min}$ requires that $U \geq U_{min}$.

As shown in FIG. 5, tool 270 may be used to make certain measurements without the actual washer stack or actual nut. Pin protrusion measurement 278 may be made, as shown in FIG. 5, in conjunction with shanking shoulder 225 so that measurement 278 may give the amount of thread length 108 of bolt 102 above thread transition zone 105. (Hypothetically, for example, pin protrusion measurement 278 could also be made in conjunction with threads-in-bearing shoulder 224 so that measurement 278 would give the actual thread length 108 of bolt 102—because inner plug 212 references the shank section 107 while plunger 272 references the end 124 of bolt 102). Returning to FIG. 5, pin protrusion measurement 278 may, thus, correspond to the pin protrusion that would be measured for an ideal washer stack of minimum thickness to prevent shanking, given the actual bolt 102. The thickness of such an ideal minimum washer stack is shown in FIG. 5 as minimum washer stack thickness 279 required to prevent shanking of bolt 102.

Equation (3), below uses $P_{ideal}$, corresponding to measurement 278 shown in FIG. 5, to represent the pin protrusion above the bearing surface of the top washer of an ideal minimum washer stack for the given bolt. (This roughly corresponds to maximum pin protrusion 110 dimension shown in FIG. 1A.) Equation (3) uses $A_{min}$ to represent the minimum washer stack thickness 279 required to prevent shanking. Equation (3) relates the measurements shown in FIG. 5 ($P_{ideal}$, $A_{min}$) to the actual pin protrusion ($P_{actual}$) and actual washer stack thickness.

$$P_{actual} = P_{ideal} - (\text{actual washer stack thickness} - A_{min}) \qquad (3)$$

Substituting equation (3) into equation (2) yields:

$$U = P_{ideal} - (\text{actual washer stack thickness} - A_{min}) - (\text{actual nut thickness}) \qquad (4).$$

It should be noted that the minimum washer stack thickness 279 measurement is the minimum washer stack required to prevent shanking, but the actual washer stack thickness may be bumped up to an actual washer stack thickness exceeding the minimum washer stack thickness 279 ($A_{min}$) because the washers only come in set increments, typically 0.016 inches. Therefore, calculation of U without knowing the actual washer stack thickness requires that the U value exceed $U_{min}$ by one washer thickness increment. Alternatively, or if the above process fails to yield $U \geq U_{min}$ by one washer thickness increment, the actual washers may be incorporated on the tool 270, for example, by stacking them on gage surface 210, to make the pin protrusion measurement 278, which would effectively perform the subtraction of equation (3) or, equivalently the first two subtractions of equation (4) above. In other words, pin protrusion measurement 278 could be made in conjunction with the top of a washer stack stacked on top of gage surface 210 so that measurement 278 would give the actual pin protrusion ($P_{actual}$ rather than $P_{ideal}$) above the bearing surface of the top washer of the actual washer stack to be installed (see equation (2)). Similarly one could calculate the U value using the maximum nut height to see if $U_{min}$ is met. Alternatively, or if the maximum nut height causes $U_{min}$ not to be met, the actual washers and nut may be incorporated on the tool 270, for example, by stacking them on gage surface 210, to make the pin protrusion measurement.

As described above, by placing the washers 106, or nut 104, or both, on the tool 270 over inner plug 212, or plunger 272, or both, and stacked on gage surface 210, one could actually have the tool 270 "perform" some or all of the subtractions in the above equations for the operator by simply reading from the plunger index markings 276 visible at the top surface 111 of washer 106, for example, or the top surface 113 of nut 104.

As noted above, fastening system installation tools 270 may have a transducer and instrumentation attached and functionally connected to the tool 270 so as to display information given by the indicators—such as shoulder 224 and index markings 276. Such instrumentation may be programmed or configured to make calculations such as equation (2) and display the results in any useful format.

Referring now to FIGS. 6A and 6B, FIG. 6A shows a fastening system installation tool 280 in accordance with another embodiment. Fastening system installation tool 280 may be similar in form and function to fastening system installation tools 200, 250, 260, and 270 and may include an outer housing or sleeve 202, with a gage surface 210 and a base surface 208, which may be seated on a structure—such as structure 120 as shown in FIG. 6A.

Tool 280 may include an inner plug 212, with a sensing end 214, which may reference an end of a bolt—such as end 124 of bolt 102—or a shank section of a bolt—such as shank section 107 of bolt 102—as shown in the exemplary embodiment illustrated in FIG. 6A. A transducer 282 may be attached, for example, to inner plug 212, and a transducer probe 284 may be connected to outer housing 202, or may reference gage surface 210, so that transducer 282 may measure, for example, relative displacement—such as axial displacement 213 (shown in FIG. 2C)—between inner plug 212 and outer housing 202. Other configurations of connecting a transducer between inner plug 212 and outer housing 202 may be easily conceived, for example, attaching a transducer to outer housing 202 and connecting the transducer probe to inner plug 212, or allowing a transducer probe 284 to directly reference the end 124 of bolt 102. A transducer or transducers may also be connected in various ways to the outer housing 210, inner plug 212, and plunger 272 of tool 270, shown in FIG. 5, for providing measurements corresponding, for example, to shoulders 224 and 225, and plunger index markings 276 shown in FIG. 5. Also, for example, the transducer may be attached or connected to be removable and replaceable for greater flexibility in the use of the tool—such as tool 280.

Transducer 282 may incorporate a display 286, as shown in FIG. 6A, for example, or may be provided with a separate display—such as hand-held electronic instrumentation with display—with a wiring harness connecting the instrumentation and display to the transducer 282. The measurements and display provided by instrumentation—such as transducer 282 and display 286—may be used in the same manner as measurements and display provided by any of the indicators described above—such as shoulders 224, 225, 226, and 228, color bands 252, 254, 256, and 258, index markings 262, and plunger index markings 276—and may be used according to the methods described above. In an alternative embodiment, signal output of transducer 282 may be connected to provide output to a controller of an automatic fastening machine so that tool 280 may be incorporated as part of an automated fastening machine, for example, by mounting tool 280 to a robot arm subassembly of the automated fastening machine and providing transducer 282 signals through a wring harness of the automated fastening machine.

FIG. 6B illustrates an exemplary installation guide 290, in accordance with an embodiment of the present invention, in the form of a table showing different alternative configurations for exemplary installation guide 290. The table of FIG. 6B shows an exemplary correspondence of a transducer 282 readout—in column 292—of fastening system installation tool 280 with exemplary installation guide 290 washer stack prescriptions—in columns 294 and 296—for stacking washers to achieve, for example, a fastening system installation in compliance with a no shanking qualitative requirement of a fastening system installation specification.

For the exemplary installation guide 290 illustrated by the table of FIG. 6B, the transducer 282 "plunger depth" of installation tool 280—values of which are shown in column 292—may indicate, for example, relative displacement—such as axial displacement 213 (shown in FIG. 2C)—between inner plug 212 and outer housing 202 so that the plunger depth may be zero when base surface 208 and the surface of sensing end 214 are co-planar. The "plunger depth" of transducer 282 thus does not include an amount of depth needed for a washer stack to cover up the thread transition zone 105 of bolt 102. For purposes of illustration, the depth of thread transition zone 105 is taken to be 0.016 inch in the example used to illustrate the embodiment shown in FIGS. 6A and 6B. The readout in columns 294 and 296 may include an allowance for the depth of the thread transition zone 105. Thus, when the transducer 282 plunger depth falls within one of the ranges shown in column 292, the prescribed washer stack minimum height shown in the same row of column 294 or the prescribed washer stack description shown in the same row of column 296 will be sufficient to cover the top of thread transition zone 105, for the exemplary fastening system having a thread transition zone 105 of 0.016 inch used in the illustration of FIGS. 6A and 6B.

For example, base surface 208 of tool 280 may be seated on structure 120 and sensing end 214 of inner plug 212 may reference shank section 107 of bolt 102 in accordance with the methods described above. Transducer 282 may provide a measurement, for example, of axial displacement 213, for example, of 0.034 inch, which may fall within the range indicated by entry 293 of column 292 in exemplary installation guide 290. Entry 293 may correspond, for example, to entry 295 in column 294, which may indicate that a washer stack with a minimum thickness of 0.064 inch is needed for the installation being performed in order to meet a no shanking qualitative requirement. Exemplary installation guide 290 may be specific to a fastening system, for example, that provides washers in either of 16 mil (0.016 inch) and 32 mil (0.032 inch) optional thicknesses so that entry 295 may indicate that the minimum thickness washer stack to meet no shanking is 0.064 inch. Thus, for a measurement in the range of 0.033 inch to 0.048 inch, display 286 may be configured to display 0.064 in conformance with exemplary installation guide 290. Alternative types of display may be used. For example, for a measurement in the range of 0.033 inch to 0.048 inch, display 286 may be configured to display "two 32 mil washers"—as indicated by entry 297 in column 296—in conformance with exemplary installation guide 290.

It should be understood that an installation guide—such as exemplary installation guide 290—can be used with any of the types of indicators described above—such as shoulders 224, 225, 226, and 228, color bands 252, 254, 256, and 258, index markings 262, and plunger index markings 276—and can be used for predicting conforming installations for nuts and bolts as well as for washer stacks as illustrated by FIGS. 6A and 6B. An installation guide—such as exemplary installation guide 290—can be used directly with a non-automated tool—such as tool 200 shown in FIGS. 2A, 2B, and 2C—or may be programmed into a digital or automated readout—such as display 286—as shown by FIGS. 6A and 6B.

It should be understood, of course, that the foregoing relates to preferred embodiments of the invention and that modifications may be made without departing from the spirit and scope of the invention as set forth in the following claims.

We claim:

1. A method for installing aerospace fastening systems to a structure, comprising the steps of:
   seating a base of an outer housing of a tool to a surface of the structure;
   referencing a shank section of a bolt of the fastening system with an inner plug of said tool;
   reading a threads-in-bearing indicator of said inner plug in conjunction with a gage surface of said outer housing;
   replacing the bolt when said threads-in-bearing indicator is not above said gage surface; and
   installing the bolt when said threads-in-bearing indicator is above said gage surface.

2. The method of claim 1, wherein said replacing step is performed due to not meeting a no threads in bearing requirement of a fastening system installation specification.

3. The method of claim 1, wherein said inner plug of said tool has a shanking indicator and further comprising steps of:
   stacking a first washer on said gage surface to form a stack;
   reading a shanking indicator of said inner plug in conjunction with the top of the stack;
   adding an additional washer to the stack when the top of the stack is below said shanking indicator; and
   adding a nut to the stack when the top of the stack is not below said shanking indicator.

4. The method of claim 3, wherein said adding an additional washer step is performed due to not meeting a no shanking requirement of a fastening system installation specification.

5. The method of claim 1, further comprising steps of:
   reading a thread bolt protrusion indicator of said inner plug in conjunction with a nut stacked on said gage surface;
   replacing the nut when the top of the nut is above said thread bolt protrusion indicator; and
   installing the nut when the top of the nut is below said thread bolt protrusion indicator.

6. The method of claim 1, further comprising steps of:
reading a thread bolt protrusion indicator of said inner plug in conjunction with a nut stacked on said gage surface;
replacing the bolt when the top of the nut is above said thread bolt protrusion indicator; and
installing the nut when the top of the nut is below said thread bolt protrusion indicator.

7. The method of claim 5, wherein said replacing step is performed due to not meeting a complete nut engagement requirement of a fastening system installation specification.

8. The method of claim 7, wherein said replacing step is performed due to not meeting a complete nut engagement requirement of a fastening system installation specification.

* * * * *